(No Model.)
H. MEINSEN.
Apparatus for Feeding Paint Mills.
No. 237,033. Patented Jan. 25, 1881.
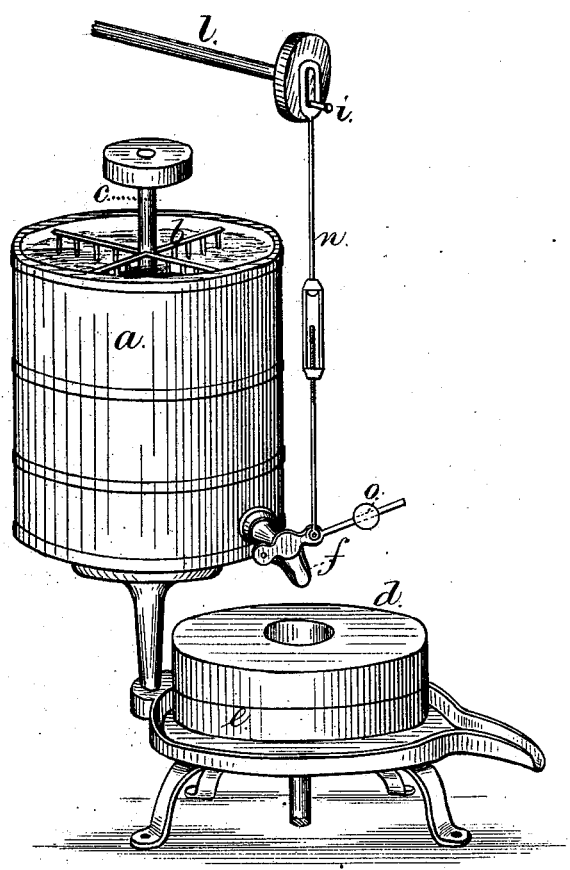
Witnesses
Harold Serrell
Geo. T. Pinckney
Inventor
Heinrich Meinsen
per Lemuel W. Serrell
atty.

UNITED STATES PATENT OFFICE.

HEINRICH MEINSEN, OF BROOKLYN, ASSIGNOR TO J. C. JESSUP & CO., OF NEW YORK, N. Y.

APPARATUS FOR FEEDING PAINT-MILLS.

SPECIFICATION forming part of Letters Patent No. 237,033, dated January 25, 1881.

Application filed April 5, 1880. (No model.)

*To all whom it may concern:*

Be it known that I, HEINRICH MEINSEN, of Brooklyn, in the county of Kings and State of New York, have invented an Improvement in Apparatus for Feeding Paint-Mills, of which the following is a specification.

In the manufacture of paints, especially water-color paints, it is usual to mix the color with the water or other liquid and place the same in an agitator containing a rotary mixer or stirrer, and from this the semi-liquid material is allowed to run into the grinding-mill, the same usually consisting of a revolving stone and a stationary bed-stone. The paint will not run with uniformity from the mixer into the grinder, because the gate or cock is liable to become partially obstructed, and then when the obstruction gives way an unusual flow of color floods the eye of the millstone, and the color passes through without being ground with uniformity. Efforts have been made to obviate this difficulty by an attendant that opens and closes the gate by hand, according to the consistency of the color and the quantity that flows through the same. This involves considerable expense, and the feed is not uniform, and the color is not uniformly ground, and hence the quality is inferior.

My invention relates to the combination, with the paint-mixer and grinding-mill, of a feed-pipe that is opened periodically at regular intervals to a given regulated distance, and allows the mixed colors to flow freely and in a small definite quantity to the grinding-mill, and then the supply is closed, and so remains until the period arrives for it to be again opened. By this means the feed is effected with great uniformity, regularity, and accuracy, and the grinding is hence uniform, and the feed is not liable to become clogged because of the sudden and wide opening of the gate or cock, and the mill can be run with but little or no attention, except to keep the mixer properly supplied.

In the drawing I have represented the improvement by a perspective view.

The mixing-vessel $a$ is provided with the stirrers $b$, revolved by the vertical shaft $c$. These parts are of any usual or desired character.

The grinding-mill $d\ e$ is also of any suitable kind.

The gate or cock $f$ is preferably made in a manner similar to a molasses-gate, and it is located so that when it is opened the color flows freely into the grinding-mill from the feed pipe or opening.

The shaft $l$ is revolved at a speed adapted to open the gate periodically. As a means for connecting the shaft to the gate I make use of the crank-pin $i$ and connecting-rod $n$, and the gate $f$ is provided with a spring or a weight, $o$, to close it. When the upper end of the rod $n$ is slotted for the crank-pin, then the said crank-pin will only lift the gate during a portion of its movement, and by providing a turn-buckle in the rod $n$ its length can be varied, so that the gate will be held open by the crank-pin for a greater or less period of time, and thereby the feed of the color to the mill can be regulated with the greatest accuracy, and the feed, being automatic and periodical, insures the proper supply and uniform grinding, as aforesaid.

I am aware that the combination, with a paint-grinding mill and a mixer, of a periodical automatic feed that regulates the supply that passes from the mixer to the mill has been used before; but in that case a revolving plug or cylinder was employed which was notched or grooved, and a scraper was also used to deliver the paint from the surface of the plug into the grinding-mill. In these there is never any opening from the paint-mixer for the escape of a jet or spurt of color. I have found it preferable to allow the color to flow suddenly and freely from the mixer to the grinder, and then to suddenly close that flow, so that there will be a sufficient mass in the mill to render the mixing more perfect while the paint is being ground; and by employing the mechanism that adjusts the motion given to the gate the supply of material is varied to suit the character of the color. This has not before been accomplished.

I claim as my invention—

1. The combination, with the paint-grinding mill and mixer, of a feed pipe and gate, and mechanism, substantially as described, for periodically opening and closing such gate, for the purposes and substantially as set forth.

2. The combination, with the paint-grinding mill and mixer, of a feed-pipe from the mixer, a gate for opening and closing the feed-pipe, a revolving crank-pin for giving motion to the gate, and a rod from the crank to the gate, provided with a device for varying its length, whereby the gate may be opened more or less, substantially as specified.

Signed by me this 24th day of March, A. D. 1880.

HEINRICH MEINSEN.

Witnesses:
    B. S. BURNHAM,
    JOHN S. EAKINS.